United States Patent
Tenzer et al.

(10) Patent No.: US 9,761,912 B2
(45) Date of Patent: Sep. 12, 2017

(54) SAFETY SYSTEM FOR BATTERIES

(71) Applicants: Martin Tenzer, Nuertingen (DE); Jens Grimminger, Leonberg (DE); Jean Fanous, Stuttgart (DE); Marcus Wegner, Leonberg (DE)

(72) Inventors: Martin Tenzer, Nuertingen (DE); Jens Grimminger, Leonberg (DE); Jean Fanous, Stuttgart (DE); Marcus Wegner, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 503 days.

(21) Appl. No.: 14/374,387

(22) PCT Filed: Dec. 3, 2012

(86) PCT No.: PCT/EP2012/074263
§ 371 (c)(1),
(2) Date: Jul. 24, 2014

(87) PCT Pub. No.: WO2013/110382
PCT Pub. Date: Aug. 1, 2013

(65) Prior Publication Data
US 2015/0017487 A1 Jan. 15, 2015

(30) Foreign Application Priority Data
Jan. 24, 2012 (DE) .......................... 10 2012 200 988

(51) Int. Cl.
*H01M 2/02* (2006.01)
*H01M 10/42* (2006.01)
(Continued)

(52) U.S. Cl.
CPC ..... *H01M 10/4235* (2013.01); *H01M 2/1094* (2013.01); *H01M 10/052* (2013.01);
(Continued)

(58) Field of Classification Search
CPC ...................................................... H01M 2/02
See application file for complete search history.

(56) References Cited

U.S. PATENT DOCUMENTS

| 5,879,834 A * | 3/1999 | Mao ................... H01M 10/4235 429/332 |
| 2002/0061436 A1 | 5/2002 | Inagaki et al. |
| 2011/0293973 A1* | 12/2011 | Kim ........................ H01M 2/04 429/53 |

FOREIGN PATENT DOCUMENTS

| EP | 0 951 080 | 10/1999 |
| JP | S55 43443 | 3/1980 |
| JP | S57 59187 | 4/1982 |

* cited by examiner

*Primary Examiner* — Jacob Marks
(74) *Attorney, Agent, or Firm* — Norton Rose Fulbright US LLP; Gerard Messina

(57) ABSTRACT

A battery, particularly a lithium-metal battery or a lithium-ion battery, having at least one galvanic cell surrounded by a cell housing. To increase the safety of the battery and to close up again a cell opened by a safety device or by a leakage, the inner chamber of the cell housing of the at least one cell includes a first chemical component, a chamber bordering on at least one section of the outer side of the housing including a second chemical component; a solid reaction product being developable by the chemical reaction of the first and second chemical components. The first component is containable in the electrolyte of the cell and the second component in a cooling and/or tempering arrangement. Also described is a cooling and/or tempering arrangement based on it, and an electrolyte, an electrolytic liquid, a safety system, a method and a mobile or stationary system.

18 Claims, 1 Drawing Sheet

(51) Int. Cl.
*H01M 2/10* (2006.01)
*H01M 10/052* (2010.01)
*H01M 10/0525* (2010.01)
*H01M 10/056* (2010.01)
*H01M 10/6567* (2014.01)

(52) U.S. Cl.
CPC ..... H01M 10/056 (2013.01); H01M 10/0525 (2013.01); H01M 10/6567 (2015.04); *H01M 2200/00* (2013.01); *H01M 2300/00* (2013.01); *Y02T 10/7011* (2013.01)

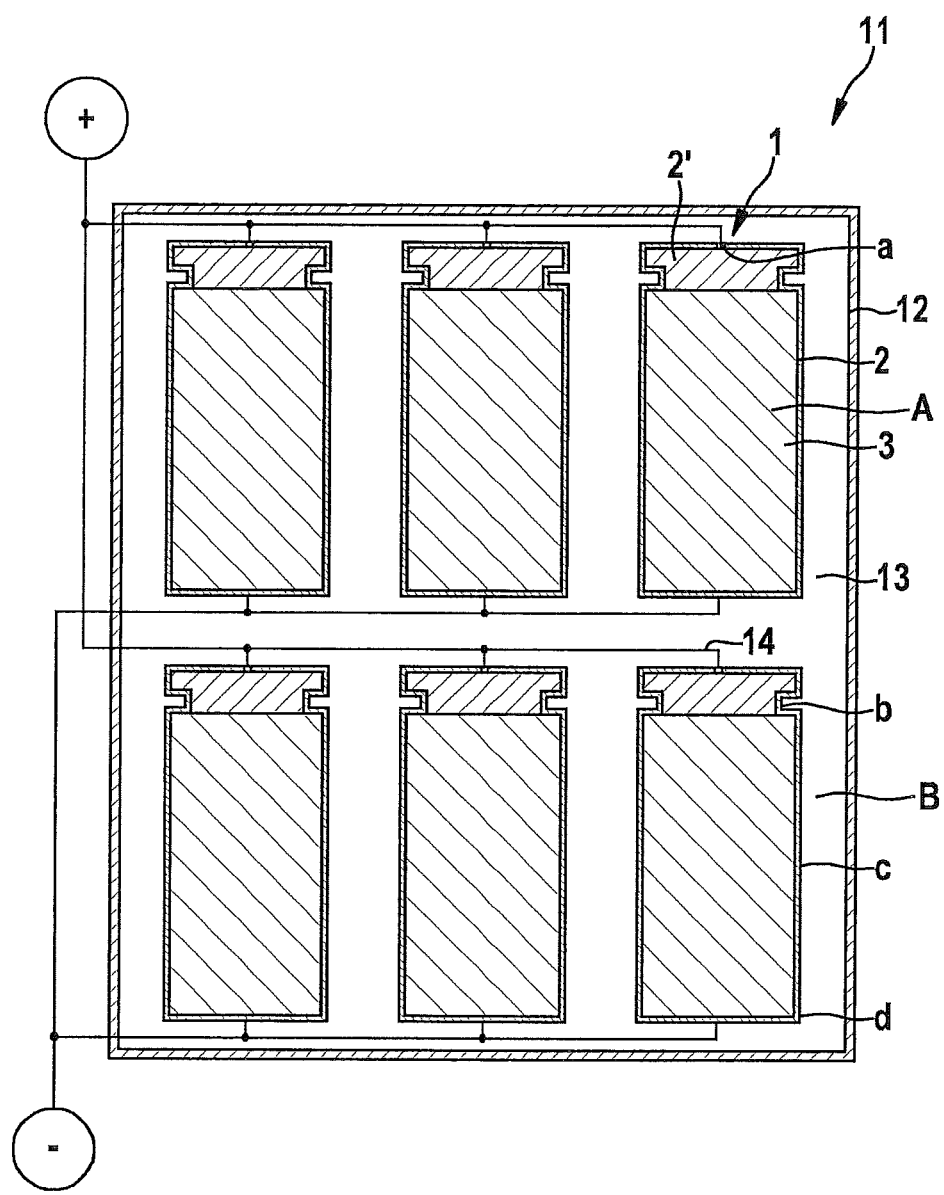

SAFETY SYSTEM FOR BATTERIES

FIELD OF THE INVENTION

The present invention relates to a battery and a cooling and/or tempering arrangement, an electrolyte and an electrolytic liquid, a safety system, a method and a mobile or stationary system.

BACKGROUND INFORMATION

Galvanic cells of lithium-metal batteries, which usually include an anode made of metallic lithium or a lithium alloy, as well as of lithium-ion batteries, which usually include an anode made of an intercalation material, such as graphite, usually have a cell housing, in whose inner chamber the electrochemically active components of the cell, such as the anode, the cathode and the electrolyte are situated.

In numerous applications, battery cells are situated in greater numbers in direct proximity to cooling arrangement and/or tempering arrangement. There are batteries, for example, in which the battery cells are situated in a battery housing in such a way that they are partially or completely surrounded by cooling arrangement or tempering arrangement, which is usually a liquid.

During the service life of a battery, it is possible, however, that leakage is created in a cell housing, for instance, by aging effects, such as corrosion, external force effects or other causes. The leakage is possible at a plurality of places of the cell housing, among others at seals, welding seams, corners or edges of the cell housing or also at other places of the cell housing. When a leakage occurs, cell components, such as electrolytic liquid, may exit from the cell housing, or rather materials from the environment of the cell housing, such as cooling and/or tempering arrangement or air may penetrate into the cell housing, which is able to lead to vehement reactions, in which the battery may be damaged irreversibly.

In addition, the galvanic cells, particularly of lithium-metal batteries and lithium-ion batteries may have a safety device which opens the cell housing when the inside pressure in the cell housing rises above a critical value, to prevent the bursting of the cell housing. In their functioning, these safety devices resemble a rupture disk, and open the cell housing irreversibly, which is why in this case, too, cell component may exit from the cell housing or materials from the surroundings of the cell housing may penetrate into the cell housing, and the battery may be damaged irreversibly.

European document EP 0 951 080 B1 discusses a three-layered battery separator which has a shut-down layer which melts at about 115° C.

SUMMARY OF THE INVENTION

The subject matter of the present invention is a battery which includes at least one galvanic cell surrounded by a cell housing. In this context, the inner chamber of the cell housing of the at least one cell includes a first chemical component. A chamber, bordering on at least one section of the outside of the cell housing of the at least one cell, includes a second chemical component. By a chemical reaction of the first chemical component with the second chemical component, a solid reaction product is thereby able to be formed.

The battery may be an alkali-metal battery, for example, particularly a lithium-metal battery or a lithium-ion battery. The present invention is based particularly on the principle that, when there is a leakage or an activation of the safety device, the first and the second chemical component come in contact with each other, and are able to react chemically while developing a solid reaction product, which is able to close up the place affected automatically. The closing up, in this connection, advantageously takes place directly at the location of the leakiness or the opening of the opened safety mechanism. The closing up is able to take place irreversibly, in this context. However, it is also possible, for example, by a targeted coordination of the components and the reaction product, for instance, to the extent that the reaction product is soluble in a special solvent or mixture of solvents, that is not used in the battery, to design the closing up to be reversible. This may simplify a recycling of battery and/or cell component, for example.

The chemical reaction is able to run, in this instance, until, because of the closed opening, no further reaction products come out or are able to come into contact with one another, and consequently, the chemical reaction comes to a halt.

The automatic closing up is possible at each location of the cell, in principle.

In the case of the activation of the safety device, its method of functioning should not be blocked or put out of action. This means that the opening of the safety device should remain open sufficiently long so that the increased internal pressure of the cell is able to be reduced, usually by a short, gaseous discharge. But, in addition, the opening of the safety device should not remain open longer, to prevent the discharge of electrolytic liquid and possibly other battery components.

This may advantageously be ensured by a chemical reaction, since a chemical reaction makes it possible to close up an opening, which has been created, in a speedy manner but not at once. Because of that, it may be ensured, in turn, that the safety device is able to fulfill its function, whereby the opening created by the safety device is able to be closed up by the solid reaction product, particularly after the internal pressure has gone down to a normal level.

In addition, it may advantageously be prevented that the whole battery fails, because of the failure of one cell. Thereby the battery safety may be increased advantageously. Particularly in the case of medium large and large batteries, as are used in hybrid electric vehicles or electric vehicles, for example, a clear increase in the safety of the entire battery may be achieved.

In the case of a small leak in a cell housing it is even possible that, after the closing up of the leak with the reaction product, the cell remains functionally capable and perhaps even has a nearly undiminished quantity of electrolytic liquid. It is also possible that a battery as a whole, particularly also having a nearly unchanged cooling and/or tempering arrangement quantity, may continue to be operated.

In this way it is possible to continue to operate the battery, even after the failure of one cell or several cells and to avoid an exchange of the complete battery or single cells as well as cooling and/or tempering arrangement, whereby the service life of the battery is advantageously able to be considerably extended.

In this way, the material costs for the components may also be amortized very rapidly.

By the closing up of the opening with the solid reaction product, particularly advantageously an increased discharge of electrolytic liquid and possibly other cell components into the surroundings, especially into an adjacent cooling and/or tempering arrangement, may be prevented.

In this way, it may be prevented, on the one hand, that the cooling and/or tempering arrangement are contaminated by cell components, which could perhaps be injurious to health. On the other hand, it may be prevented in that way that cooling and/or tempering arrangement, which are frequently protic and may contain water, are able to react with cell components, such as lithium and/or fluorine-containing electrolyte salts. In particular, in cells which contain metallic lithium, the danger may be reduced that lithium particles are discharged from the cell and/or cooling and/or tempering arrangement penetrate into the cell and are able to react with one another in a strongly exothermic manner.

In addition, numerous reactions of aprotic, or rather nonaqueous, mostly combustible cooling and/or tempering arrangement with cell components may also advantageously be avoided.

Within the scope of the present invention, by a cell housing one may understand both a dimensionally stable, or rather a rigid housing for a galvanic cell and a flexible housing for a galvanic cell, such as a foil pack, for instance, a pouch cell.

By a solid reaction product one may particularly understand both a solid body, such as a metal salt or a crystalline or amorphous or partially crystalline or partially amorphous polymer, as well as a gel, such as a gel-type polymer.

The present invention will be described with the aid of a galvanic cell, while using the concept "of the at least one cell". The battery may, however, include more galvanic cells, in particular, for example, at least a plurality of cells or even all cells of the battery being able to be executed in the same way as explained while using the concept "of the at least one cell".

Within the scope of one specific embodiment, the at least one cell includes an electrolytic liquid, the first chemical component being contained, in particular, dissolved in it.

Within the scope of a further specific embodiment, the battery includes a cooling and/or tempering arrangement, the second chemical component being contained, in particular, dissolved in the cooling and/or tempering arrangement. The cooling and/or tempering arrangement may particularly be a liquid. For example, the cooling and/or tempering arrangement may include water and/or one or more diols, such as ethylene glycol, diethylene glycol and/or propane diol and/or one or more triols.

The battery may particularly include a cooling and/or tempering device for cooling and/or tempering the at least one cell having the cooling and/or tempering arrangement.

Within the scope of one further specific embodiment, the chamber bordering on at least one section of the outside of the cell housing of the at least one cell is configured for conveying the cooling and/or tempering arrangement. In this context, in particular, the cell housing of the at least one cell may be partially or completely surrounded by the chamber for conveying the tempering arrangement.

Within the scope of an additional specific embodiment, the cell housing of the at least one cell has a safety device, by which the cell housing is able to be opened in the case of an overpressure in the inner chamber of the cell housing.

The cell housing of the at least one cell may be a cylindrical, a prismatic or a pyramidal cell housing.

Within the scope of still another specific embodiment, the battery has a battery housing, a plurality of galvanic cells being situated within the battery housing. The cells are particularly each surrounded by a cell housing, in this context. Between the outsides of the cell housings and the inside of the battery housing a chamber may be developed, in this context, configured particularly for conveying a cooling and/or tempering arrangement, the chamber surrounding the cell housing partially or completely, and including the second chemical component.

Within the scope of yet another specific embodiment, the chemical reaction is a polyreaction or a precipitation reaction. Polyreactions and precipitation reactions may advantageously have a suitable start-up time.

Within the scope of another specific embodiment, the chemical reaction is, in particular, a radical or ionic one, for instance, a cationic or anionic one, a polymerization reaction or a polycondensation reaction or a polyaddition reaction. These chemical reactions advantageously have a short start-up time. In addition, the reaction products developed thereby, particularly polymers, may have properties such as elastic properties, adhesive properties and the capability of gel formation, which advantageously have an effect on the speedy closing up, especially without the impairment of the functioning of a safety device, and the prevention of the discharge or the penetration of materials.

Within the scope of yet another specific embodiment, the chemical reaction is a particularly radical, cationic or anionic polymerization reaction. In particular, in this context, the first component may include or be a radical polymerization starter (radical former), for instance, dibenzoyl peroxide and/or diacetyl peroxide, or a cationic polymerization starter, such as tetrafluoroboric acid ($HBF_4$), or an anionic polymerization starter, such as a lithium organyl, the second component including or being at least one monomer that is able to be polymerized by a radical or cationic or anionic polymerization reaction, for instance, propylene, styrene, aniline, vinyl chloride and/or vinyl carbonate.

Or in reverse, in this context, the first component may include or be at least one monomer that is able to be polymerized by a radical or cationic or anionic polymerization reaction, such as propylene, styrene, aniline, vinyl chloride and/or vinyl carbonate, the second component including or being a radical polymerization starter, for instance, dibenzoyl peroxide and/or diacetyl peroxide, or a cationic polymerization starter, such as tetrafluoroboric acid ($HBF_4$), or an anionic polymerization starter, such as a lithium organyl.

Within the scope of yet another specific embodiment, the chemical reaction is a polycondensation reaction.

The chemical reaction may, for instance, be a polycondensation reaction, by which a phenolic plastic is able to be developed. In particular, in this context, the first component is able to include or be a phenol and the second component may include or be an aldehyde. Or in reverse, in this context, the first component is able to include or be an aldehyde and the second component may include or be a phenol.

The chemical reaction may, for instance, be a polycondensation reaction, by which a polyester is able to be developed. In particular, in this context, the first component is able to include or be a dicarboxylic acid and the second component may include or be an (alkyl-)diol or an (alkyl-)triol or an (alkyl-)polyol. Or in reverse, in this context, the first component is able to include or be an (alkyl-)diol or an (alkyl-)triol or an (alkyl-)polyol and the second component may include or be a dicarboxylic acid.

The chemical reaction may, for instance, be a polycondensation reaction, by which a polyamide is able to be developed. In particular, in this context, the first component is able to include or be a dicarboxylic acid and the second component may include or be a diamine. Or in reverse, in this context, the first component is able to include or be a diamine and the second component may include or be a dicarboxylic acid.

Within the scope of yet another specific embodiment, the chemical reaction is a polyaddition reaction. The chemical reaction may, for instance, be a polycondensation reaction, by which a polyurethane is able to be developed. In particular, in this context, the first component is able to include or be an isocyanate and the second component may include or be an (alkyl-)diol or an (alkyl-)triol or an (alkyl-)polyol. Or in reverse, in this context, the first component is able to include or be an (alkyl-)diol or an (alkyl-)triol or an (alkyl-)polyol and the second component may include or be an isocyanate.

Within the scope of yet another specific embodiment, the chemical reaction is a precipitation reaction.

By precipitation reaction one may understand a reaction in which a first component dissolved in a solvent and a second component dissolved in a solvent react with each other when coming into contact to form an insoluble reaction product, which is precipitated as a solid substance.

In particular, the insoluble reaction product may be a metal salt of low solubility, such as a metal chloride, a metal sulfide or a metal carbonate.

For example, in this context, the first component may include or be a soluble chloride, sulfide and/or carbonate, especially in the electrolytic liquid, and the second component may include or be a soluble metal salt, especially in the cooling and/or tempering arrangement. Or in reverse, in this context, the second component may include or be a soluble metal salt, especially in the electrolytic liquid, and the second component may include or be a soluble chloride, sulfide and/or carbonate, especially in the cooling and/or tempering arrangement.

The respective components should be checked particularly for their compatibility with the surrounding medium and the surrounding components, in order to avoid side reactions, for example, with the electrolyte, especially the supporting electrolyte and the solvent of the electrolytic liquid, or other cell components or the cooling and/or tempering arrangement.

With regard to further features and advantages of the battery according to the present invention, we hereby explicitly refer to the explanations in connection with the cooling and/or tempering arrangement according to the present invention, the electrolyte according to the present invention and the electrolytic liquid according to the present invention, the safety system according to the present invention, the method according to the present invention, the mobile or stationary system according to the present invention as well as to the FIGURE and the description of the FIGURE.

One further subject matter of the present invention is a cooling and/or tempering liquid for a battery, an alkali metal battery, for example, particularly a lithium-ion battery or a lithium-metal battery. The cooling and/or tempering arrangement, in particular, includes at least one solvent and a chemical component dissolved in the solvent, the chemical component dissolved in the solvent being selected from the group made up of chlorides, sulfides, carbonates, metal salts, radical polymerization starters, such as dibenzoyl peroxide and/or diacetyl peroxide, cationic polymerization starters, such as tetrafluoroboric acid ($HBF_4$), anionic polymerization starters, such as lithium organyls, monomers able to be polymerized by radical or cationic or anionic polymerization reaction, such as propylene, styrene, aniline, vinyl chloride and/or vinyl carbonate, phenols, aldehydes, dicarboxylic acids, (alkyl-) polyols, diamines and isocyanates. The at least one solvent may be selected, for instance, from the group made up of water, diols, such as ethylene glycol, diethylene glycol and propane diol, triols and mixtures thereof. The at least one solvent and the chemical component dissolved in it may be selected in such a way that at least one solvent and the chemical component do not react with each other chemically, especially while forming a solid reaction product.

The cooling and/or tempering arrangement may be used particularly in combination with the electrolytic liquid explained below. The combinations of components suitable for this are explained in detail in connection with the battery according to the present invention. For instance, the cooling and/or tempering arrangement may be used in a battery in which the galvanic cells are situated in immediate proximity to a cooling and/or tempering arrangement. The cooling and/or tempering arrangement may be used, for example, in a battery in which the galvanic cells are situated in a battery housing in such a way that they are partially or completely surrounded by a cooling and/or tempering arrangement. The cooling and/or tempering arrangement may be used, in particular, in a battery according to the present invention or in a system or in a method according to the present invention explained below.

With regard to further features and advantages of the cooling and/or tempering arrangement according to the present invention, we hereby explicitly refer to the explanations in connection with the battery according to the present invention, the electrolyte according to the present invention and the electrolytic liquid according to the present invention, the safety system according to the present invention, the method according to the present invention, the mobile or stationary system according to the present invention as well as to the FIGURE and the description of the FIGURE.

A further subject matter of the present invention is an electrolyte, particularly an electrolytic liquid, for a galvanic cell, such as an alkali-metal cell, in particular, a lithium-metal cell or a lithium-ion cell. The electrolyte or the electrolytic liquid, in particular, may include at least one solvent and a chemical component dissolved in the solvent, the chemical component dissolved in the solvent being selected from the group made up of chlorides, sulfides, carbonates, metal salts, radical polymerization starters (radical formers), such as dibenzoyl peroxide and/or diacetyl peroxide, cationic polymerization starters, such as tetrafluoroboric acid ($HBF_4$), anionic polymerization starters, such as lithium organyls, monomers able to be polymerized by a radical or cationic or anionic polymerization reaction, particularly propylene, styrene, aniline, and/or vinyl chloride, phenols, aldehydes, dicarboxylic acids, (alkyl-)diols, (alkyl-)triols, (alkyl-)polyols, diamines and isocyanates. The at least one solvent may then be selected, for example, from the group made up of (organic) carbonates, such as ethyl carbonate, propyl carbonate, ethylmethyl carbonate, diethyl carbonate, dimethyl carbonate, dioxolane, ethers, such as dimethoxyethane, diethoxyethane, triethyleneglykoldimethyl ether, tetraethyleneglykoldimethyl ether, and mixtures thereof.

The electrolyte and the electrolytic liquid may (furthermore) include at least one supporting electrolyte dissolved in the solvent. For example, the at least one supporting electrolyte, dissolved in the solvent, may be selected from the group made up of lithium hexafluorophosphate ($LiPF_6$), lithium bis(trifluoromethane)sulfonimide (LiTFSI), LiN ($SO_2CF_2CF_3$)$_2$ (LiBETI) and mixtures thereof.

The at least one solvent, the chemical component dissolved in it and the supporting electrolyte dissolved in it may be selected in such a way that these do not react chemically with one another, particularly while forming a solid reaction product.

The electrolyte or the electrolytic liquid may particularly be used in combination with the cooling and/or tempering arrangement explained above. The combinations of components suitable for this are explained in detail in connection with the battery according to the present invention. For instance, the electrolyte or the electrolytic liquid may be used in a battery in which the galvanic cells are situated in immediate proximity to a cooling and/or tempering arrangement. The electrolyte or the electrolytic liquid may be used, for example, in a battery in which the galvanic cells are situated in a battery housing in such a way that they are partially or completely surrounded by a cooling and/or tempering arrangement. The electrolyte or the electrolytic liquid may be used, in particular, in a battery according to the present invention or in a system or in a method according to the present invention explained below.

With regard to further features and advantages of the electrolyte according to the present invention or the electrolytic liquid according to the present invention, we hereby explicitly refer to the explanations in connection with the battery according to the present invention, the cooling and/or tempering arrangement according to the present invention, the safety system according to the present invention, the method according to the present invention, the mobile or stationary system according to the present invention as well as to the FIGURE and the description of the FIGURE.

A further subject matter of the present invention is a system, a safety system, for example, particularly for improving the safety of a battery, especially a lithium-metal battery or a lithium-ion battery which includes an electrolyte including a first chemical component, for example, an electrolyte according to the present invention or an electrolytic liquid according to the present invention and a cooling and/or tempering arrangement including a second chemical component, for instance, a cooling and/or tempering arrangement according to the present invention. The first and second chemical component may particularly be selected in this context, in such a way that, because of a polyreaction, especially a polymerization reaction or a polycondensation reaction or a polyaddition reaction or a precipitation reaction of the first chemical component with the second chemical component a solid reaction product is able to be developed.

In this context, for instance, the (first) chemical component dissolved in the solvent or the solvents of the electrolyte or the electrolytic liquid and the (second) chemical component dissolved in the solvent or the solvents of the cooling and/or tempering means may be selected in such a way that, because of a polyreaction, particularly a polymerization reaction or a polycondensation reaction or a polyaddition reaction or a precipitation reaction, the (first) chemical component dissolved in the solvent or the solvents of the electrolyte or the electrolytic liquid with the (second) chemical component dissolved in the solvent or the solvents of the cooling and/or tempering arrangement, a solid reaction product is able to be formed.

The combinations of components suitable for this are explained in detail in connection with the battery according to the present invention.

The system may advantageously be used to furnish already existing batteries with an additional safety function.

With regard to further features and advantages of the safety system according to the present invention, we hereby explicitly refer to the explanations in connection with the battery according to the present invention, the cooling and/or tempering arrangement according to the present invention, the electrolyte according to the present invention or the electrolytic liquid according to the present invention, the method according to the present invention, the mobile or stationary system according to the present invention as well as to the FIGURE and the description of the FIGURE.

One more subject matter of the present invention is a method.

Such a method may particularly be an operating method for a galvanic cell, especially a lithium-metal cell or a lithium-ion cell, having a cell housing or for an at least one battery including at least one galvanic cell surrounded by a cell housing, particularly a lithium-metal battery or a lithium-ion battery.

The method may, for example, be a method for closing up a cell housing, opened up by a safety device or by a leakage, of an alkali-metal cell, especially a lithium-metal cell or a lithium-ion cell.

The method particularly includes that, in the case of the opening of a/the cell housing by a safety device or by a leakage, a first chemical component and a second chemical component are brought into contact, whereby the first component reacts chemically with the second component in such a way, while forming a solid reaction product, that the opening created by the safety device or by leakage is closed up by the reaction product, particularly automatically and/or irreversibly.

With regard to further features and advantages of the method according to the present invention, we hereby explicitly refer to the explanations in connection with the battery according to the present invention, the cooling and/or tempering arrangement according to the present invention, the electrolyte according to the present invention or the electrolytic liquid according to the present invention, the safety system according to the present invention, the mobile or stationary system according to the present invention as well as to the FIGURE and the description of the FIGURE.

An additional subject matter of the present invention is a mobile or stationary system which includes a battery according to the present invention and/or a cooling and/or tempering arrangement according to the present invention and/or an electrolyte according to the present invention and/or an electrolytic liquid according to the present invention and/or a safety system according to the present invention and/or carries out a method according to the present invention.

In particular, in this context, a vehicle may be involved, for instance, a hybrid vehicle, a plug-in hybrid vehicle or an electric vehicle, an energy storage system, for instance, for stationary power storage, for instance, in a house or a technical plant, an electric tool, an electric garden appliance or an electronic unit, for instance, a notebook, a PDA or a mobile telephone.

Based on the particularly high requirements for a long service life and great safety in automotive applications, the batteries according to the present invention, the cooling and/or tempering arrangement according to the present invention, the electrolyte according to the present invention, the electrolytic liquid according to the present invention, the safety system according to the present invention and the method according to the present invention are especially suitable for hybrid vehicles, plug-in hybrid vehicles and electric vehicles.

With regard to further features and advantages of the mobile or stationary system according to the present invention, we hereby explicitly refer to the explanations in connection with the battery according to the present invention, the cooling and/or tempering arrangement according to the present invention, the electrolyte according to the present invention or the electrolytic liquid according to the present invention, the safety system according to the present invention, the method according to the present invention as well as to the FIGURE and the description of the FIGURE.

Further advantages and advantageous refinements of the subject matters of the present invention are illustrated by the drawing and explained in the following description. In this context, it should be noted that the drawing has only descriptive character and is not intended to limit the present invention in any form.

BRIEF DESCRIPTION OF THE DRAWING

The FIGURE shows a schematic sketch of a specific embodiment of a battery according to the present invention.

DETAILED DESCRIPTION

FIG. 1 shows a specific embodiment of a battery 11 according to the present invention, particularly a lithium-metal battery or a lithium-ion battery. FIG. 1 illustrates that the battery includes six galvanic cells 1, which are each surrounded by a cylindrical or prismatic cell housing 2,2'. The electrochemically active components of the cells, such as the anode, the cathode and the electrolyte (not shown) are in each case contained in inner chamber 3 of cell housing 2,2' of cells 1. In this context, the electrolyte includes a first chemical component A. In particular, in this case, first chemical component A may be dissolved in the electrolytic liquid.

FIG. 1 also shows that battery 11 has a battery housing 12, within which galvanic cells 1 are situated. Between the exterior of cell housing 2,2' and the interior of battery housing 12, a chamber 13 is developed that is configured for conveying a cooling and/or tempering arrangement, which in the sketch surrounds cell housings 2,2' and which includes a liquid cooling and/or tempering arrangement as well as a second chemical component B. Second chemical component B may be dissolved particularly in the cooling and/or tempering arrangement, in this instance. FIG. 1 illustrates that in each case at least one section of the exteriors of cell housings 2,2' of the cells borders on chamber 13 that is configured to convey the cooling and/or tempering arrangement.

Furthermore, FIG. 1 shows that the cell housings 2,2' of cells 1 each have a safety device 2', by which the respective cell housing 2,2' is able to be opened in case of an overpressure in inner chamber 3 of cell housing 2,2'. For this purpose, safety device 2' has an opening a that is able to be opened as a function of pressure.

In addition, FIG. 1 shows potential leakage locations b, c, d. Leakage may occur at a plurality of places of cell housing 2,2', and in particular a leak may occur at a seal b, at corners and/or edges c or at a welding seam d of the cell housing.

Now, the safety mechanism according to the present invention is based on the idea that, in response to the opening of opening a, safety device 2', and in response to a leak b, c, d first chemical component A and second chemical component B come into contact with each other and first component A reacts chemically with second component B, to form a solid reaction product, which then closes up the affected opened location (opening or leakage/leakiness) a, b, c, d. The chemical reaction of the two components A, B may be a polyreaction in particular, especially a polymerization reaction, a polycondensation reaction or a polyaddition reaction, or a precipitation reaction. In this context, the chemical reaction of the two components A, B runs until components A, B are no longer able to reach each other through the affected, previously opened and now closed location a, b, c, d. In the reaction, the contact of the two components A, B takes place the more intensively, the bigger the affected opened or leaky location a, b, c, d is.

What is claimed is:

1. A battery, comprising:
   a cell housing; and
   at least one galvanic cell surrounded by the cell housing;
   wherein an inner chamber of the cell housing of the at least one cell includes a first chemical component,
   wherein a chamber, which borders on at least one section of the outside of the cell housing of the at least one cell, includes a second chemical component, and
   wherein by a chemical reaction of the first chemical component with the second chemical component, a solid reaction product is formed.

2. The battery of claim 1, wherein the at least one cell includes an electrolytic liquid, and the first chemical component is contained in the electrolytic liquid.

3. The battery of claim 1, further comprising:
   at least one of a cooling arrangement and a tempering arrangement, wherein the second chemical component is contained in the at least one of a cooling arrangement and a tempering arrangement.

4. The battery of claim 1, wherein the chamber bordering on at least one section of the outside of cell housing of the at least one cell is configured to convey the cooling and/or tempering arrangement.

5. The battery of claim 1, wherein the cell housing of the at least one cell has a safety device, by which the housing is open-able in case of an overpressure in the inner chamber of the housing.

6. The battery of claim 1, wherein the battery has a battery housing and within the battery housing is a plurality of galvanic cell, which are each surrounded by a cell housing, and wherein between the outsides of the cell housings and the inside of the battery housing a chamber is configured for conveying a cooling and/or tempering arrangement, the chamber partially or completely surrounding the cell housing and including the second chemical component.

7. The battery of claim 1, wherein the chemical reaction is one of a polyreaction or a precipitation reaction.

8. The battery of claim 1, wherein the chemical reaction is one of a radical cationic an an anionic polymerization reaction, wherein the first component includes one of a radical polymerization starter, a cationic polymerisation starter, and an anionic polymerisation starter, and wherein the second component includes at least one monomer that is polymerizable by a radical or cationic or anionic polymerization reaction.

9. The battery of claim 1, wherein the chemical reaction is a polycondensation reaction, and wherein one of the following is satisfied:
   (i) the first component includes a phenol and the second component includes an aldehyde, or vice versa;
   (ii) the first component includes a dicarboxylic acid and the second component includes a diol, a triol, or a polyol, or vice versa; and
   (iii) the first component includes a dicarboxylic acid and the second component includes a diamine, or vice versa.

10. The battery of claim 1, wherein the chemical reaction is a polyaddition reaction, and wherein the first component includes an isocyanate and the second component includes a diol or a triol or a polyol, or vice versa.

11. The battery of claim 1, wherein the chemical reaction is a precipitation reaction, and wherein the first component includes a chloride, sulfide and/or carbonate that is soluble and the second component includes a metal salt that is soluble, or vice versa.

12. The battery of claim 1, wherein the battery includes a lithium-metal battery or a lithium-ion battery.

13. The battery of claim 1, wherein the chamber bordering on at least one section of the outside of cell housing of the at least one cell is configured to convey the cooling and/or tempering arrangement, and wherein the cell housing of the at least one cell is partially or completely surrounded by the chamber for conveying the cooling and/or tempering arrangement.

14. The battery of claim 1, wherein the chemical reaction is one of (i) a precipitation reaction and (ii) one of a polymerization reaction, a polycondensation reaction, a polyaddition reaction.

15. The battery of claim 1, wherein the chemical reaction is one of a radical cationic an an anionic polymerization reaction, wherein the first component includes a radical polymerization starter, especially dibenzoyl peroxide and/or diacetyl peroxide, or a cationic polymerisation starter, especially tetrafluoroboric acid, or an anionic polymerisation starter, particularly a lithium organyl, and wherein the second component includes at least one monomer that is able to be polymerized by a radical or cationic or anionic polymerization reaction, particularly propylene, styrene, aniline, vinyl chloride and/or vinyl carbonate, or vice versa.

16. The battery of claim 1, wherein the chemical reaction is a precipitation reaction, and wherein the first component includes a chloride, sulfide and/or carbonate that is soluble in the electrolytic liquid and the second component includes a metal salt that is soluble, or vice versa.

17. The battery of claim 1, wherein the first chemical component dissolved in a solvent, and is selected from the group made up of chlorides, sulfides, carbonates, metal salts, radical polymerization starters, particularly dibenzoyl peroxide and/or diacetyl peroxide, cationic polymerization starters, particularly tetrafluoroboric acid, anionic polymerization starters, particularly lithium organyls, monomers able to be polymerized by radical or cationic or anionic polymerization reaction, particularly propylene, styrene, aniline, vinyl chloride and/or vinyl carbonate, phenols, aldehydes, dicarboxylic acids, polyols, diamines, and isocyanates.

18. The battery of claim 1, wherein the first chemical component dissolved in a solvent, and is selected from the group made up of chlorides, sulfides, carbonates, metal salts, radical polymerization starters, particularly dibenzoyl peroxide and/or diacetyl peroxide, cationic polymerization starters, particularly tetrafluoroboric acid, anionic polymerization starters, particularly lithium organyls, monomers able to be polymerized by radical or cationic or anionic polymerization reaction, particularly propylene, styrene, aniline, vinyl chloride and/or vinyl carbonate, phenols, aldehydes, dicarboxylic acids, diols, triols, polyols, diamines, and isocyanates.

* * * * *